US009930052B2

(12) United States Patent
Liu et al.

(10) Patent No.: US 9,930,052 B2
(45) Date of Patent: Mar. 27, 2018

(54) PRE-PROCESSING BEFORE PRECISE PATTERN MATCHING

(71) Applicant: INTERNATIONAL BUSINESS MACHINES CORPORATION, Armonk, NY (US)

(72) Inventors: Dan U. Liu, Beijing (CN); Yang L. Liu, Shanghai (CN); Yong Lu, Shanghai (CN); Yong Feng Pan, Shanghai (CN); Yan Ying, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 14/278,090

(22) Filed: May 15, 2014

(65) Prior Publication Data

US 2015/0007320 A1 Jan. 1, 2015

(30) Foreign Application Priority Data

Jun. 27, 2013 (CN) .......................... 2013 1 0260868

(51) Int. Cl.
*G06F 17/30* (2006.01)
*H04L 29/06* (2006.01)

(52) U.S. Cl.
CPC .......... *H04L 63/1408* (2013.01); *H04L 63/14* (2013.01); *G06F 2207/025* (2013.01)

(58) Field of Classification Search
CPC ................. H04L 63/14; H04L 63/1408; G06F 2207/025
(Continued)

(56) References Cited

U.S. PATENT DOCUMENTS 4,550,436 A * 10/1985 Freeman ........... G06F 17/30985
340/146.2
5,150,430 A * 9/1992 Chu .................... H03M 7/3086
341/51
(Continued)

FOREIGN PATENT DOCUMENTS

CN 102163221 A 8/2011
CN 102622359 A 8/2012
(Continued)

OTHER PUBLICATIONS

Kernighan, Brian W., et al., The C Programming Language, Prentice-Hall, Inc., Englewood Cliffs, NJ, © 1978, pp. 65-67, 98-102 and 112-113.*

(Continued)

*Primary Examiner* — Robert Stevens
(74) *Attorney, Agent, or Firm* — L. Jeffrey Kelly

(57) ABSTRACT

A method for pattern matching finds a target pattern from a stream of patterns, both of the stream of patterns and the target pattern being comprised of elements. The method includes acquiring occurrence numbers of target elements in the target pattern, initializing the buffer, the buffer indicating a section in the stream of patterns, determining whether occurrence numbers of the target elements in the buffer reach the occurrence numbers of the target elements in the target pattern, updating the buffer and then returning to the determining step, in response to determining that the occurrence numbers of the target elements in the buffer do not reach the occurrence numbers of the target elements in the target pattern, and outputting the elements in the buffer for subsequent processing, in response to determining that the occurrence numbers of the target elements in the buffer reach the occurrence numbers of the target elements in the (Continued)

target pattern. A device and a circuit for pattern matching are also provided to increase the speed for pattern matching.

17 Claims, 7 Drawing Sheets

(58) Field of Classification Search
USPC .............................................. 707/758; 726/23
See application file for complete search history.

(56) References Cited

U.S. PATENT DOCUMENTS

| | | | | |
|---|---|---|---|---|
| 5,525,982 | A * | 6/1996 | Cheng | H03M 7/3086 341/106 |
| 5,805,832 | A * | 9/1998 | Brown | G06F 17/2755 704/1 |
| 5,870,750 | A | 2/1999 | Oyama et al. | |
| 7,016,896 | B2 * | 3/2006 | Shibuya | G06F 17/30985 |
| 7,702,629 | B2 * | 4/2010 | Cytron | G06F 17/30985 707/999.006 |
| 7,783,654 | B1 * | 8/2010 | Sreenath | G11C 15/00 365/189.07 |
| 7,840,072 | B2 | 11/2010 | Kumar et al. | |
| 8,230,272 | B2 | 7/2012 | Middleton et al. | |
| 8,301,604 | B1 | 10/2012 | Anker et al. | |
| 8,397,285 | B2 | 3/2013 | Balakrishnan et al. | |
| 2003/0018647 | A1 * | 1/2003 | Bialkowski | H03M 7/30 |
| 2004/0250027 | A1 | 12/2004 | Heflinger | |
| 2008/0071783 | A1 | 3/2008 | Langmead et al. | |
| 2009/0125515 | A1 * | 5/2009 | Goetz | G06F 17/30985 |
| 2009/0182744 | A1 * | 7/2009 | Arning | G06F 17/277 |
| 2012/0130983 | A1 | 5/2012 | Ryan et al. | |
| 2013/0054522 | A1 | 2/2013 | Gao et al. | |

FOREIGN PATENT DOCUMENTS

| | | |
|---|---|---|
| CN | 101876986 B | 11/2012 |
| CN | 104252469 A | 12/2014 |
| WO | 02073449 A1 | 9/2002 |

OTHER PUBLICATIONS

Ierusalimschy, Roberto, "A text pattern-matching tool based on Parsing Expression Grammars", Software—Practice and Experience, vol. 39, © 2008 John Wiley and Sons, Ltd., pp. 221-258.*

Fernandez, Edward, et al., "String Matching in Hardware using the FM-index", FCCM 2011, Salt Lake City, UT, IEEE Computer Society, pp. 218-225.*

Baeza-Yates, Ricardo A., et al., "Fast and Practical Approximate String Matching", Combinatorial Pattern Matching, Tucson, AZ, Apr. 29-May 1, 1992, pp. 185-192.*

Kim et al., "A New String Search Tree with Multiple Alignment", 2012 IEEE 12th International Conference on Computer and Information Technology, Date of Conference: Oct. 27-29, 2012, pp. 456-463.

Le et al., "A Memory-Efficient and Modular Approach for Large-Scale String Pattern Matching", IEEE Transactions on Computers, vol. 62, No. 5, May 2013, pp. 844-857.

Li et al., "Spatial Approximate String Search", IEEE Transactions on Knowledge and Data Engineering, vol. 25, No. 6, Jun. 2013, pp. 1394-1409.

* cited by examiner

| SERIAL NUMBER OF CHARACTERS IN THE TEXT | TEXT | OCCURRENCE NUMBERS OF TARGET CHARACTERS IN THE BUFFER | | | | |
|---|---|---|---|---|---|---|
| | | H:1,E:1,L:0,O:0 COLUMN 1 | H:1,E:2,L:2,O:1 COLUMN 2 | H:0,E:1,L:0,O:1 COLUMN 3 | H:1,E:2,L:2,O:1 COLUMN 4 | H:1,E:1,L:2,O:1 COLUMN 5 |
| 0 | H | H | H | | | |
| 1 | E | E | E | | | |
| 2 | | | | | | |
| 3 | I | I | I | | | |
| 4 | S | S | S | | | |
| 5 | | | | | | |
| 6 | C | | C | | | |
| 7 | A | | A | | | |
| 8 | L | | L | | | |
| 9 | L | | L | | | |
| 10 | E | | E | | | |
| 11 | D | | D | D | D | |
| 12 | | | | | | |
| 13 | J | | J | J | J | |
| 14 | O | | O | O | O | |
| 15 | E | | | E | E | |
| 16 | . | | | | . | |
| 17 | H | | | | H | H |
| 18 | E | | | | E | E |
| 19 | L | | | | L | L |
| 20 | L | | | | L | L |
| 21 | O | | | | | O |
| 22 | , | | | | | |
| 23 | J | | | | | |
| 24 | O | | | | | |
| 25 | E | | | | | |
| 26 | ! | | | | | |

*FIG. 3*

| TARGET STRING | LENGTH | MATCHING NUMBER | MATCHING NUMBER OF FEATURE | AVERAGE JUMPING DISTANCE |
|---|---|---|---|---|
| go | 2 | 194 | 4040 | 37.63 |
| ab | 2 | 213 | 2546 | 59.71 |
| ll | 2 | 670 | 4712 | 32.26 |
| pp | 2 | 114 | 1521 | 99.96 |
| leo | 3 | 0 | 5033 | 30.2 |
| dog | 3 | 6 | 2890 | 52.6 |
| eet | 3 | 24 | 8364 | 18.18 |
| mme | 3 | 7 | 2016 | 75.42 |
| nice | 4 | 8 | 3242 | 46.89 |
| does | 4 | 22 | 4478 | 33.95 |
| tele | 4 | 4 | 4762 | 31.92 |
| octo | 4 | 0 | 2876 | 52.85 |
| would | 5 | 82 | 2210 | 68.78 |
| Alice | 5 | 395 | 3239 | 46.93 |
| meter | 5 | 0 | 2788 | 54.55 |
| tight | 5 | 1 | 3143 | 48.39 |
| jumped | 6 | 6 | 231 | 658.16 |
| saucer | 6 | 1 | 2361 | 64.4 |
| rabbit | 6 | 6 | 1229 | 123.67 |
| corner | 6 | 5 | 2271 | 66.93 |

*FIG. 6A*

| TARGET STRING | LENGTH | MATCHING NUMBER | MATCHING NUMBER OF FEATURE | AVERAGE JUMPING DISTANCE |
|---|---|---|---|---|
| mustard | 7 | 3 | 1986 | 76.58 |
| talking | 7 | 16 | 1426 | 106.47 |
| present | 7 | 6 | 1874 | 81.16 |
| thought | 7 | 80 | 2406 | 63.21 |
| birthday | 8 | 1 | 1397 | 108.83 |
| disapear | 8 | 0 | 1740 | 87.38 |
| thinking | 8 | 10 | 1433 | 105.93 |
| Soo--oop | 8 | 7 | 1470 | 103.4 |
| favourite | 9 | 1 | 1017 | 149.32 |
| anxiously | 9 | 14 | 275 | 548.58 |
| different | 9 | 9 | 1455 | 104.48 |
| creatures | 9 | 10 | 2091 | 72.71 |
| understood | 10 | 1 | 2346 | 64.81 |
| surprising | 10 | 0 | 1259 | 120.77 |
| adventures | 10 | 4 | 1204 | 126.16 |
| Interesting | 11 | 5 | 2382 | 63.85 |
| interrupted | 11 | 9 | 1510 | 100.68 |
| opportunity | 11 | 8 | 948 | 160.42 |
| e--e--evening | 13 | 3 | 1139 | 133.35 |
| bread-and-butter | 16 | 5 | 1012 | 150.19 |
| important--unimportant | 22 | 1 | 757 | 200.83 |
| the quick brown fox jumps over the lazy dog | 43 | 0 | 53 | 2867.58 |

*FIG. 6B*

PRE-PROCESSING BEFORE PRECISE PATTERN MATCHING

BACKGROUND

The present invention relates to information processing technologies, and more specifically, to a method, a device and a circuit structure for pattern matching.

Pattern matching means finding a specific pattern from a stream of patterns. Pattern matching is a basic technique in computer applications. As an example, finding a target string from a text is a kind of pattern matching. In such a scenario, the target string to be found corresponds to the above specific pattern and the text corresponds to the above stream of patterns. As another example, Deep Packet Inspection (DPI), which has been widely applied to Intrusion Detection/Intrusion Prevention, Spam Blocking, Antivirus, Data Leakage Prevention, Content Filtering or the like, detects whether there is a packet or a sequence of packets with attack characteristics in a stream of data. In this scenario, the stream of data corresponds to the above stream of patterns, and the packet or the sequence of packets with attack characteristics correspond to the above specific pattern.

On one hand, a long term of research has been conducted for pattern matching and numerous software algorithms have been obtained. On the other hand, as can be appreciated by a person of skill in the art, circuit components in a hardware platform operate in parallel and thereby a faster speed can be reached. Accordingly, it is desired to implement the software algorithms with hardware so as to increase the speed of pattern matching. However, a problem of high cost and high complexity will be confronted when transplanting a whole software algorithm into the hardware platform. To this end, it may be envisaged to transplant a portion of the software algorithm suitable for hardware implementation into the hardware platform.

SUMMARY

A method, a device and a circuit for pattern matching are provided in the present invention.

According to an embodiment of the present invention, there is provided a method for pattern matching that finds a target pattern from a stream of patterns, both of the stream of patterns and the target pattern being comprised of elements, the method comprising: acquiring occurrence numbers of target elements in the target pattern; initializing a buffer, the buffer indicating a section in the stream of patterns; determining whether occurrence numbers of the target elements in the buffer reach the occurrence numbers of the target elements in the target pattern; updating the buffer and then returning to the determining step, in response to determining that the occurrence numbers of the target elements in the buffer do not reach the occurrence numbers of the target elements in the target pattern; outputting the elements in the buffer for subsequent processing, in response to determining that the occurrence numbers of the target elements in the buffer reach the occurrence numbers of the target elements in the target pattern.

According to another embodiment of the present invention, there is provided a device for pattern matching that finds a target pattern from a stream of patterns, both of the stream of patterns and the target pattern being comprised of elements, the device comprising: an acquiring means configured to acquire occurrence numbers of target elements in the target pattern; a buffer initialization means configured to initialize the buffer, the buffer indicating a section in the stream of patterns; a comparing means configured to determine whether occurrence numbers of the target elements in the buffer reach the occurrence numbers of the target elements in the target pattern; an updating means configured to update the buffer and then return to perform the determination, in response to determining that the occurrence numbers of the target elements in the buffer do not reach the occurrence numbers of the target elements in the target pattern; an outputting means configured to output the elements in the buffer for subsequent processing, in response to determining that the occurrence numbers of the target elements in the buffer reach the occurrence numbers of the target elements in the target pattern.

According to another embodiment of the present invention, there is provided a circuit for pattern matching comprising: a buffering module for storing elements currently being processed; an element parsing module for determining elements that are newly incorporated in the buffer; a buffer feature table updating module for updating occurrence numbers of target elements in the buffer based on determination result of the element parsing module; a buffer feature table storing module for recording occurrence numbers of the respective target elements in the buffer; a reference feature table storing module for storing a reference feature table; and a comparing module for comparing the buffer feature table storing module and the reference feature table storing module to determine whether the occurrence numbers of the respective elements in the buffer reach the occurrence numbers of the elements in a target pattern.

The technical solutions according to the embodiments of the present invention can increase the speed for pattern matching.

BRIEF DESCRIPTION OF THE DRAWINGS

Through the more detailed description of some embodiments of the present disclosure in connection with the accompanying drawings, the above and other objects, features and advantages of the present disclosure will become more apparent, wherein the same reference number generally refers to the same components in the embodiments of the present disclosure.

FIG. 3 is an operation schematic diagram of a method for pattern matching according to an embodiment of the present invention;

FIGS. 6A and 6B illustrate experimental results according to an embodiment of the present invention.

DETAILED DESCRIPTION

Figure 1:
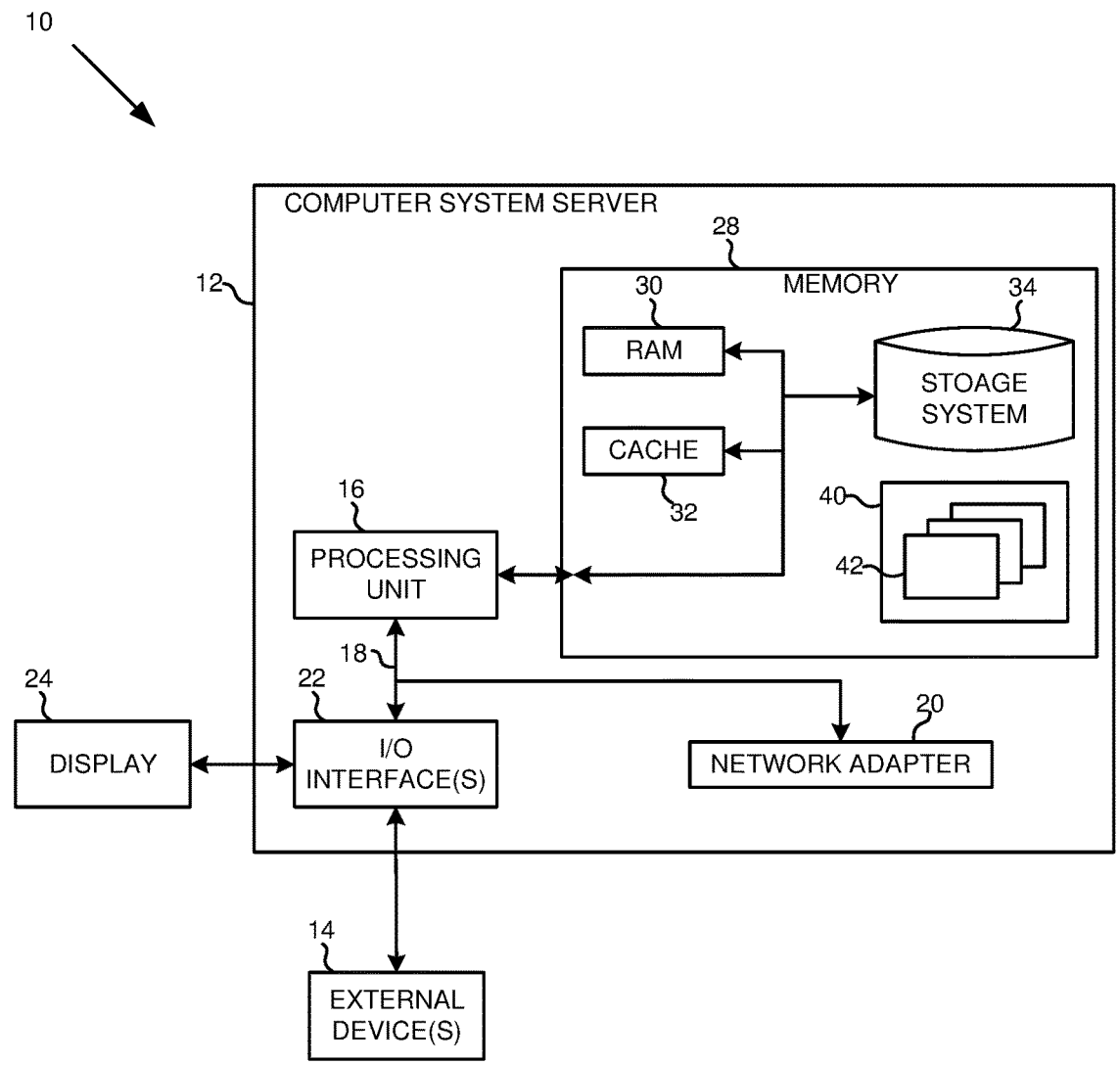
FIG. 1 is a block diagram of an exemplary computer system/server 12 which is applicable to implement the embodiments of the present invention.

Some preferable embodiments of the present disclosure will be described below in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which an exemplary computer system/server 12 which is applicable to implement the embodiments of the present invention is shown. Computer system/server 12 as shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, the program modules 42 including, but not limited to, an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other modules of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The method for pattern matching according to an embodiment of the present invention is actually a method for pre-processing before a precise pattern matching. The method may be implemented in software or hardware. Finding a target string in a text is exemplified in the following description. Those skilled in the art would readily conceive of extending the method according to the embodiment of the present invention described below by taking the text and the target string as an example to a general scenario of pattern matching for finding a target pattern from a stream of patterns. The stream of patterns is comprised of consecutive elements, where the element is a basic unit. The elements in the stream of patterns form a variety of patterns. It could be a case where one element forms a pattern, and could also be a case where a plurality of consecutive elements form a pattern. Pattern matching means finding a target pattern from the variety of patterns that can be formed of the elements of the stream of patterns. A text is comprised of consecutive characters, where a character is a basic unit. The characters of the text form a variety of strings. It could be a case where one character forms a string, and could also be a case where a plurality of consecutive characters form a string. Finding a target string in a text means finding a target string from the variety of strings formed of the characters of the text. Thus, the text is a representation of the stream of pattern, the target string is a representation of the target pattern, and the character is a representation of the element.

The method for pattern matching according to an embodiment of the present invention is described below in connection with FIG. 2.

At step 201, an occurrence number(s) of at least a portion of the elements in the target pattern is acquired.

For simplicity, assuming that processing is performed merely on capital English letter(s) in the text and the target string. It is assumed that the target string is "HELLO". In the target string "HELLO", "H" occurs one time, "E" occurs one time, "L" occurs two times and "O" occurs one time. In the following description, a length of the target string is denoted by "â". Said acquiring may comprise calculating on the input target string so as to obtain the occurrence numbers or acquiring by directly receiving the occurrence numbers.

As described in the foregoing, the method according to the embodiment of the present invention may be implemented in software or hardware. Accordingly, the method may be optimized differently for the software and hardware implementations, respectively.

According to another embodiment of the present invention, occurrence numbers of several characters which occur at highest frequencies are obtained. The number of characters to be obtained may be determined by a character number threshold. For example, the character number threshold may be set at 3. If "A" occurs 5 times in a string, "B" occurs 4 times, "C" occurs 3 times, each of "D" and "E" occurs 2 times, then only occurrence numbers for "A", "B" and "C" are obtained. The obtained portion of characters may be referred to as target characters, and the occurrence numbers of the target characters in the obtained target string may be referred to as target numbers. In the software implementation, the speed for subsequent steps can be increased by obtaining occurrence numbers of only a portion of characters of the target string. Below, description will be provided in relation to other steps shown in FIG. 2.

According to an embodiment of the present invention, occurrence numbers of all characters in the target string that belong to a target character set are obtained. The target character set refers to a set of characters included in all possible target strings. For all the possible target string being composed of capital English letters, for example, the target character set includes all the 26 English letters. Accordingly, occurrence numbers of all the 26 capital English letters in "HELLO" are obtained. That is, an occurrence number of zero is obtained for all the capital English letters other than the above four. In the hardware implementation, a complexity degree of the hardware can be decreased by obtaining the occurrence numbers of all the characters in the target character set, thereby the speed for hardware processing can be increased. This will be illustrated when describing a circuit for pattern matching according to an embodiment of the present invention in connection with other figures.

At step 203, a buffer is initialized.

The buffer indicates a section of text by using a buffer starting point indicator and a buffer ending point indicator, the section including a certain number of characters. The buffer starting point indicator is close to the beginning of the text, and the buffer ending point indicator is close to the end of the text. The buffer starting point indicator indicates a character in the buffer that is closest to the beginning of the text, and the buffer ending point indicator indicates a character not in the buffer and closest to the end of the text. The buffer starts at the character indicated by the buffer starting point indicator and ends at a character before the one indicated by the buffer ending point indicator. In the following description, when a reference is made to a direction of the text, a character "a" is before another character "b" and the direction from the character "a" to "b" is a forward direction, if the location of the character "a" is closer to the beginning of the text than the character "b"; accordingly, the character "b" is after the character "a", and the direction from the character "b" to "a" is a backward direction.

According to an embodiment of the present invention, an initial value of the buffer ending point indicator indicates the same character as that indicated by the buffer starting point indicator. In this case, the buffer does not contain any character, that is, the length of the buffer is zero.

According to another embodiment of the present invention, assuming that the character at the beginning of the text is the zero-th character, the character indicated by the initial value of the buffer starting point indicator is the zero-th character of the text, and the character indicated by the initial value of the buffer ending point indicator is the (â−1)th character. At this moment, the length of the buffer is "â−1" characters. As described above, the method according to the embodiment of the present invention is actually a method for pre-processing before the precise pattern matching. If the length of the buffer is small, the characters contained in the buffer are unable to cover the target string, thereby the pre-processing is not required for these situations.

At step 205, the buffer is updated.

Updating the buffer results in moving the buffer ending point indicator towards the end of the text by one character, so as to incorporate a new character into the buffer. At this moment, the length of the buffer is â.

Upon moving the buffer ending point indicator towards the end of the text by one character, the character indicated by the buffer ending point indicator before the movement is incorporated into the buffer. The effect is equivalent to expanding the buffer towards the end of the text by one character.

The step of updating the buffer may also be implemented as a part of the step 209.

At step 207, it is determined whether the occurrence numbers of the target element in the buffer reach the target numbers.

If, at step 203, the character indicated by the initial value of the buffer starting point indicator is the zero-th character in the text and the character indicated by the initial value of the buffer ending point indicator is the (f−1)th character in the text, "f−1" characters are included in the buffer. Upon processing at step 205, f characters are included in the buffer. Steps 205 and 207 may be performed several times as will be described later in more detail, thus the buffer may be extended towards the end of the text character by character, that is, more and more characters will be included in the buffer. As a result, as long as the text is long enough, the occurrence numbers of the target characters in the buffer will finally reach the target numbers even if they do not reach the target numbers when step 207 is performed for the first time.

A counter may be provided for each target character, with its initial value determined by the character(s) in the buffer with the length of f. Every time when a new character is incorporated into the buffer, comparison as to whether the new character is one of the target characters is performed; if so, a corresponding counter is updated.

If only occurrence numbers of a portion of characters in the target string are obtained at step 201, only counters for this portion of characters are required to be provided at this step, and only a comparison of the new character with this portion of characters is required; in this way, number of comparison may be reduced and operation speed of the software may be increased.

At step 209, in response to the determination that the occurrence numbers of the target elements in the buffer do not reach the target numbers, processing is returned to step 205.

At step 211, in response to the determination that the occurrence numbers of the target elements in the buffer reach the target numbers, the buffer is outputted for subsequent processing.

If the occurrence numbers of the target characters in the buffer reach the target numbers, it indicates that the characters contained in the buffer may possibly cover the target string. According to an embodiment of the present invention, the entire buffer is outputted for subsequent processing, such as the precise pattern matching operation.

According to another embodiment of the present invention, outputting the buffer for subsequent processing comprises outputting f characters in the buffer that are closest to the end of the text for the precise pattern matching operation. This is because if the target string exists at a location in the buffer close to the beginning of the text, the occurrence numbers of the target characters in the buffer will have reached the target numbers at that location. Hence if the buffer contains the target string, it must be the case where the f characters closest to the end of the text in the buffer form the target string.

Through the above steps, a section of the text may be identified with a length longer than that of the target string. Only the last f characters in the section need to be considered when performing the precise pattern matching operation. Assuming that the section has a length of y, the precise pattern matching operation needs to be performed only once for the y characters in the text. In the conventional method for pattern matching, however, the precise pattern matching operation needs to be performed once for every character in the text. It will be understood by those skilled in the art that the highest volume of resources are consumed by the precise pattern matching operation, and thus the speed for pattern matching may be significantly increased by reducing the numbers of the precise pattern matching operation.

If the precise pattern matching operation finds out that the target string is not contained in the buffer, the buffer may be reset and then the processing is returned to step 203. Assuming that the character indicated by the buffer ending point indicator is ath character in the text at this moment, the buffer starting point indicator is updated to indicate the (a−f+1)th character in the text according to an embodiment of the present invention. In this case, the length of the buffer is restored to "f−1". That is to say, the last "f−1" characters in the old buffer are the same as the first "f−1" characters in the new buffer. This is because the last "f−1" characters in the old buffer may match the first "â−1" characters of the target string, although the last a characters in the old buffer do not match it, which may also cause the target string to be not included in the old buffer. As such, upon proceeding to perform the step 205 to thereby incorporate a character into the new buffer, the new buffer may possibly contain the target string. It will be understood by those skilled in the art that "â−1" is the minimum amount of overlap between the old and new buffers.

It is also possible that the precise pattern matching operation finds out the target string is contained in the buffer, that is, the last a characters in the buffer form the target string. If it is necessary to continue to find the target string from the remaining portion of the text, the character indicated by the current buffer ending point indicator is used as a new starting point of the text, i.e. the zero-th character in the text, and then the new buffer starting point indicator and buffer ending point indicator are initialized as described at step 203.

Figure 2:
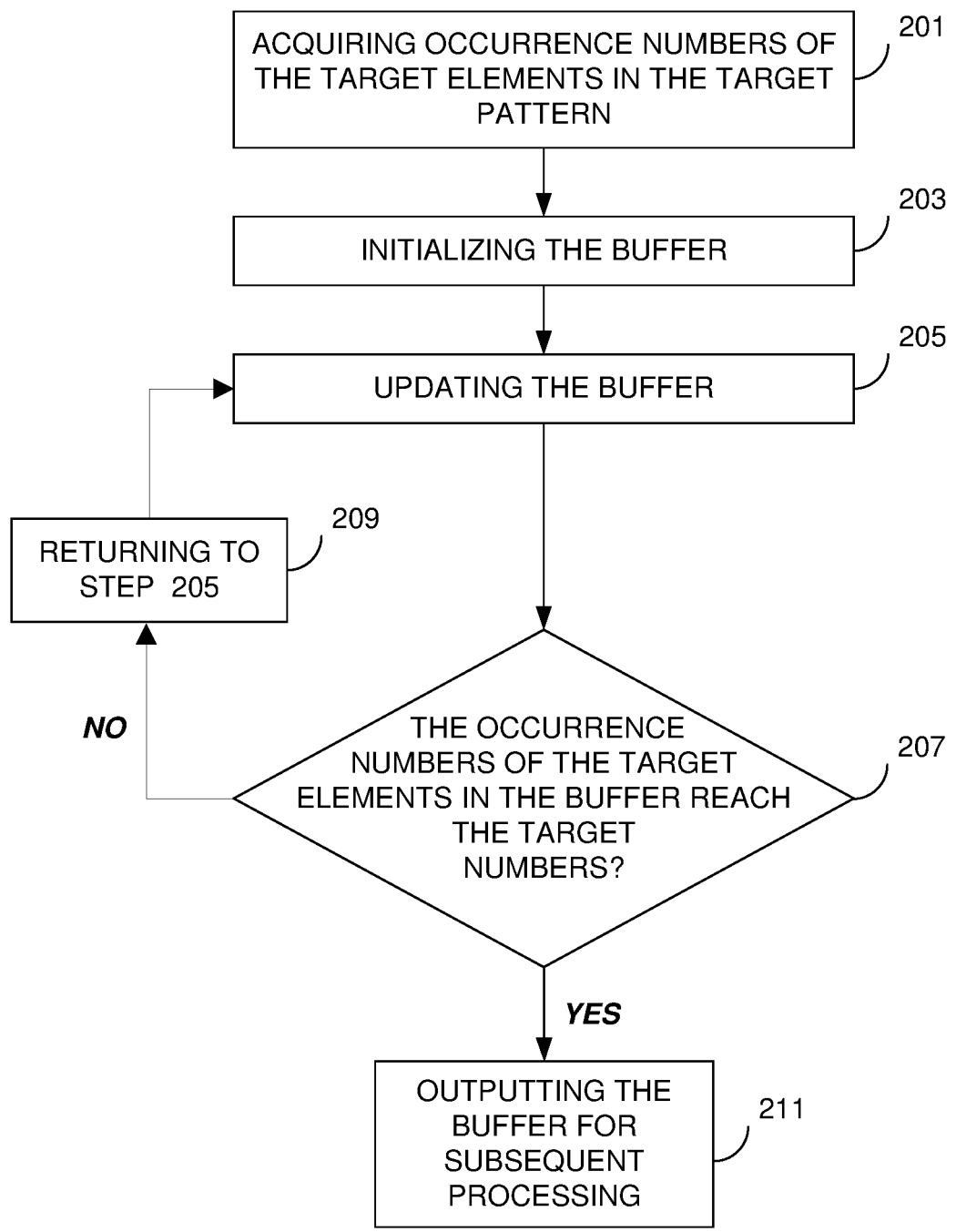
FIG. 2 is a flow chart of a method for pattern matching according to an embodiment of the present invention.

In the following, the method shown in FIG. 2 is described in connection with the example of FIG. 3.

In FIG. 3, assuming that the text is "HE IS CALLED JOE.HELLO,JOE!", and the target string is "HELLO" which is case insensitive. Further assuming that occurrence numbers for all the characters are acquired at step 201, thus the target characters include "H", "E", "L" and "O", and the target numbers are 1 for "H", 1 for "E", 2 for "L", and 1 for "O". The value of "a" is 5.

After the initialization at step 203, the buffer starting point indicator indicates the zero-th character in the text, i.e. "H", and the buffer ending point indicator indicates the fourth character in the text, i.e. "S".

After performing the step 205, the buffer ending point indicator indicates the fifth character, and the content in the buffer at this moment is indicated by the dotted line in the first column of FIG. 3. At step 207, the calculated occurrence numbers for the target characters in the buffer is 1 for "H", 1 for "E", 0 for "L" and 0 for "O". Processing then proceeds to step 209 where it is returned to step 205.

After the steps 205, 207 and 209 are performed several times, the buffer ending point indicator indicates the 14$^{th}$ character in the text, i.e. "O". At this moment, the step 205 is performed once again so that the buffer ending point indicator indicates the 15$^{th}$ character and the content in the buffer at this moment is indicated by the dotted line in the second column of FIG. 3. In step 207, the calculated occurrence numbers for the target characters in the buffer are 1 for "H", 2 for "E", 2 for "L" and 1 for "O". That is, the target numbers are reached, and the processing then enters step 211. As can be seen, the last 5 characters in the buffer is "ED JO" which is apparently not the desired target string "HELLO".

Now, the processing is returned to step 203 where the buffer starting point indicator is updated to indicate the "15−5+1=11"th character in the text to thereby obtain a new buffer. After performing the step 205, the buffer ending point indicator indicates the 16$^{th}$ character in the text, and the content in the buffer at this moment is indicated by the dotted line in the third column of FIG. 3. At step 207, the calculated occurrence numbers for the target characters in the buffer are 0 for "H", 1 for "E", 0 for "L" and 1 for "O". As such, the procedure proceeds to step 209 where it is returned to step 205.

After the steps 205, 207 and 209 are performed several times, the buffer ending point indicator indicates the 20$^{th}$ character in the text, i.e. "L". At this moment, the step 205 is performed once again, so that the buffer ending point indicator indicates the 21$^{th}$ character and the content in the buffer at this moment is indicated by the dotted line in the fourth column of FIG. 3. In step 207, the calculated occurrence numbers for the target characters in the buffer are 1 for "H", 2 for "E", 2 for "L" and 1 for "O". That is, the target numbers are reached, and the processing then enters step 211. As can be seen, the last 5 characters in the buffer is ".HELL" which apparently is still not the desired target string "HELLO".

Now, the processing is returned to step 203 where the buffer starting point indicator is updated to indicate the "21−5+1=17"th character in the text to thereby obtain a new buffer. After performing the step 205, the buffer ending point indicator indicates the 22$^{th}$ character in the text, and the content in the buffer at this moment is indicated by the dotted line in the fifth column of FIG. 3. At step 207, the calculated occurrence numbers for the target characters in the buffer are 1 for "H", 1 for "E", 2 for "L" and 1 for "O". That is, the target numbers are reached and the processing proceeds to step 211. As can be seen, the last 5 characters in the buffer at this moment is "HELLO" which is the desired target string.

If it is necessary to continue to find the target string "HELLO" in the remaining portion of the text, the character indicated by the current buffer ending point indicator (i.e. the 22$^{th}$ character), i.e. "," is used as the new buffer starting point indicator, and the above steps are repeated.

Figure 4:
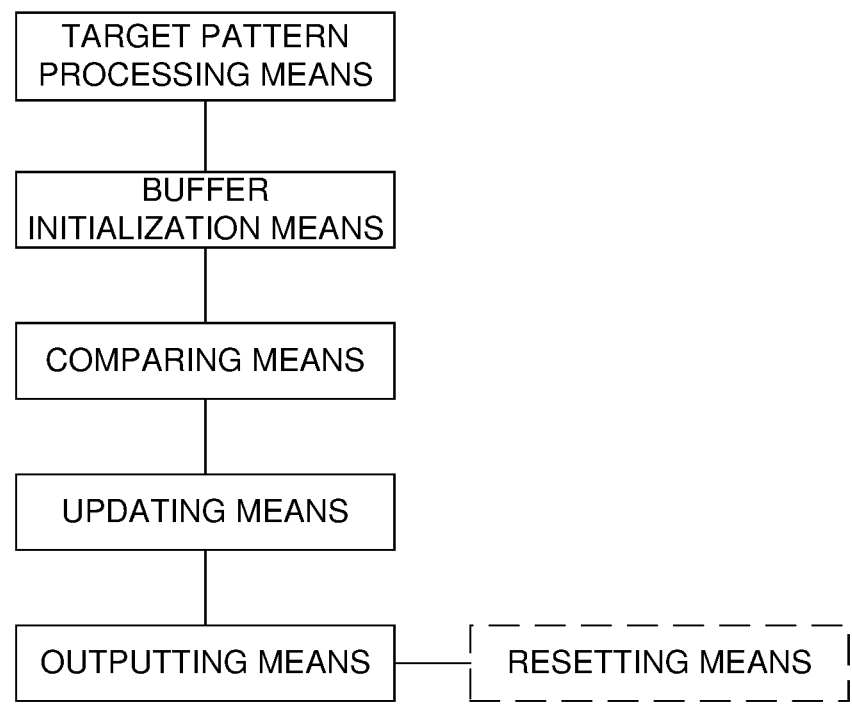
FIG. 4 is a block diagram of a device for pattern matching according to an embodiment of the present invention.

FIG. 4 illustrates a block diagram of an apparatus for pattern matching according to an embodiment of the present invention.

A device for pattern matching that finds a target pattern from a stream of patterns according to an embodiment of the present invention, comprising:

an acquiring means configured to acquire occurrence numbers of target elements in the target pattern;

a buffer initialization means configured to initialize the buffer, the buffer indicating a section in the stream of patterns;

a comparing means configured to determine whether occurrence numbers of the target elements in the buffer reach the occurrence numbers of the target elements in the target pattern;

an updating means configured to update the buffer and then return to perform the determination, in response to determining that the occurrence numbers of the target elements in the buffer do not reach the occurrence numbers of the target elements in the target pattern;

an outputting means configured to output the elements in the buffer for subsequent processing, in response to determining that the occurrence numbers of the target elements in the buffer reach the occurrence numbers of the target elements in the target pattern.

Wherein, the initial length of the buffer is the length of the target pattern.

Wherein, the outputting means comprises a module for outputting 3 elements that entered in the buffer in the last place for subsequent processing.

The device further comprises a buffer resetting means configured to reset the buffer and then return to the determination, in response to discovering in the subsequent processing that the target pattern is not contained in the buffer.

Wherein, the buffer is reset such that the first "â−1" elements in the new buffer overlap with the last "â−1" in the old buffer.

Wherein, the target elements are the entirety of elements contained in potential target patterns.

Below, a circuit for pattern matching according to an embodiment of the present invention is described with reference to FIG. 5.

Figure 5:
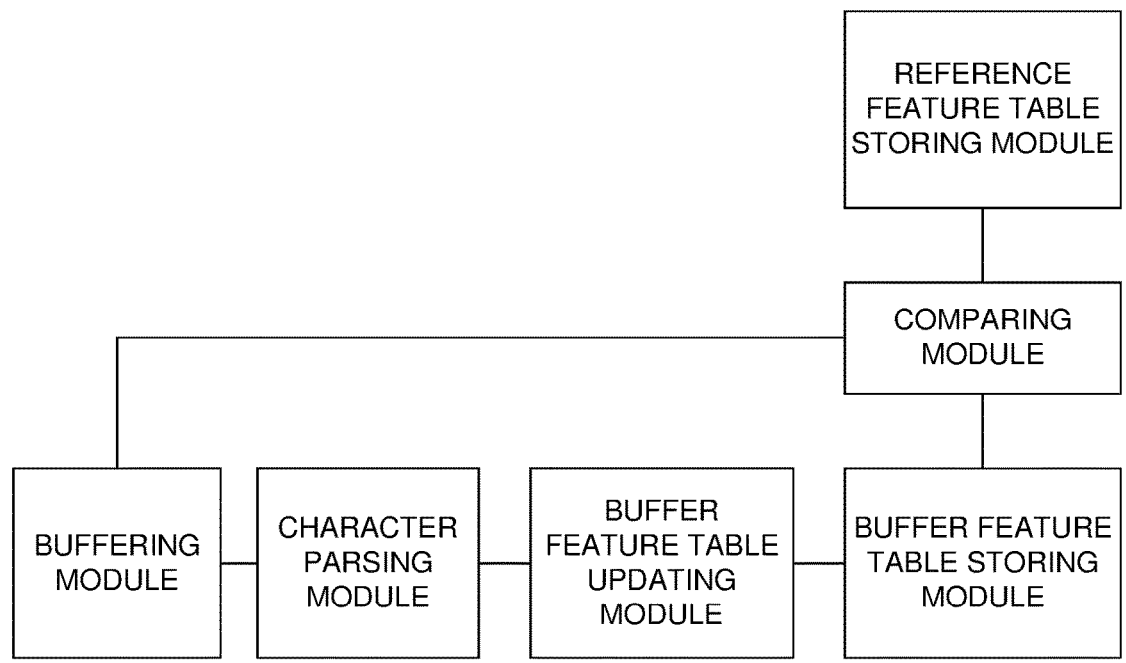
FIG. 5 is a block diagram of a circuit for pattern matching according to an embodiment of the present invention.

In the description of the circuit shown in FIG. 5, it is assumed that both the text and the target string contain only the 26 capital English letters.

In FIG. 5, a buffering module is provided for storing characters currently being processed and corresponds to the above-described buffer. In terms of hardware, the main part of a storing module is a series of memory units. The characters in the buffer will be outputted at one time for subsequent processing, as described above at step 211. A module storing all the characters in the text is called text storing module. According to an embodiment in the present invention, the buffering module may be implemented as a part of the text storing module with the storage region comprised in the buffering module indicated by the buffer starting point indicator and the buffer ending point indicator. A description regarding how to set the buffer starting point indicator and the buffer ending point indicator has been provided in connection with FIGS. 2 and 3. According to another embodiment of the present invention, the buffering module is separate from the text storing module. The characters are read one-by-one from the text storing module to the buffering module to form the buffer.

A character parsing module is provided for determining which character the one newly incorporated in the buffer corresponds to. The character parsing module has an input connected to the buffering module and an output connected to a feature updating module. According to an embodiment of the present invention, the character parsing module outputs a feature vector of 26 bits, each bit corresponding to a capital English letter. It may be configured such that if a specific bit in the feature vector is zero, it indicates that the character newly incorporated into the buffer corresponds to a capital English letter corresponding to that bit. It can be understood by those skilled in the art that, for a specific character, only one bit could be zero in its feature vector.

It can be understood by those skilled in the art that the characters may be represented by using binary codes. According to ASCII codes, for example, a character is represented by eight bits (i.e. a byte). According to an embodiment of the present invention, the character parsing module may be implemented by using a comparator. ASCII codes corresponding to the 26 capital English letters are stored respectively. When a new character enters in the buffer, ASCII code of the new character is compared with ASCII codes corresponding to the stored capital English letters, so as to determine which capital English letter the character newly entered in the buffer is. As can be understood by those skilled in the art, a comparison between two bits may be implemented by using an Exclusive-OR gate with two inputs, where if levels of the two inputs are different, the output is 1; and if the levels of the two inputs are the same, the output is 0. Accordingly, a comparison between two bytes may be embodied by using a comparator including eight Exclusive-OR gates with two inputs and an OR gate with eight inputs, where the inputs of the OR gate are connected to the outputs of the Exclusive-OR gates. The two bytes are the same when the output of the OR gate is a logical zero. In this way, the output of the OR gate may be used directly as a value of the bit corresponding to the capital English letter in the feature vector. It can be appreciated that 26 comparators as described above are required in order to generating in parallel the values of the bits corresponding to the respective capital English letters in the feature vector.

According to another embodiment in the present invention, the character parsing module may be implemented by using a decoder. Because the ASCII codes for the 26 capital English letters are determinate, the mapping relationship between the inputs and outputs of the character parsing module is also determinate. In such a case, the mapping relationship may be embodied by using a specific combinational circuit. A 3-8 decoder which is well-known to those skilled in the art maps a 3-bit input to an 8-bit output, with each combination of the 3-bit input corresponding to a specific 8-bit output where a certain bit takes a different value from others; for example, the certain bit takes 1 while others take 0. Based on the same principle, it may also be embodied as an 8-26 decoder for mapping an 8-bit input to a 26-bit output, where the 8-bit input is an ASCII code of a character and the 26-bit output is the above-described feature vector. It may also be embodied as a 5-26 decoder since the ASCII codes for the 26 capital English letters have only five different bits.

The circuit employing the decoder is simpler than that employing the comparator, and as a result the circuit area may be reduced. Further, signals are subjected to less stages of gates, so that the circuit employing the decoder has a higher processing speed than that employing the comparator.

A buffer feature table storing module is provided for recording occurrence numbers of the respective characters in the buffer. A buffer feature table updating module updates the buffer feature table storing module based on the outputs of the character parsing module. As described in the foregoing, the output of the character parsing module is a feature vector that indicates which one of the 26 capital English letters the character newly entered in the buffer is. The buffer feature table updating module updates the occurrence number of the corresponding character recorded in the buffer feature table storing module based on the feature vector.

For each character, it is necessary to determine how many bits in the buffer feature table storing module are used to record the occurrence number of the character. The number of the bits may be referred to as a depth of the buffer feature table storing module. For example, if an occurrence number of a character is recorded with four bits, occurrence of the character may be recorded for at most 15 times, and in this case the buffer feature table storing module has 104 (26*4) bits; if an occurrence number of a character is recorded with 1 bit, occurrence of the character may be recorded for at most one time, and in this case the buffer feature table storing module has 26 bits.

According to another embodiment of the present invention, the depth may be determined by collecting statistics about the occurrence numbers of the respective characters in different target strings. For example, if, in terms of common target strings, it is assumed that the occurrence number of any character in any common target string does not exceed 3, or the probability of exceeding 3 is not higher than a certain probability threshold, the depth may be determined to be 2 bits.

A comparing module is provided for determining whether the occurrence numbers of the respective characters in the buffer reach those in the target string.

According to an embodiment of the present invention, the occurrence number of each character recorded in the buffer feature table storing module when initializing the buffer is zero. The occurrence numbers recorded in the buffer feature table storing module are incremented as the characters are incorporated into the buffer one by one. In this instance, the occurrence numbers for the respective characters in the target string are stored in a reference feature table storing module as shown in FIG. 5. The reference feature table storing module has the same length as the buffer feature table storing module. The comparing module compares the buffer feature table storing module with the reference feature table storing module, and in the case when the two are the same, outputs a signal instructing the buffering module to output the characters in the buffer for subsequent processing.

According to another embodiment of the present invention, the occurrence number of each character recorded in the buffer feature table storing module when initializing the buffer is the occurrence number of each of the characters in the target string. The occurrence numbers recorded in the buffer feature table storing module are decremented as the characters are incorporated into the buffer one by one. In this instance, values of zero are stored in a reference feature table storing module of FIG. 5. The comparing module compares the buffer feature table storing module with zero, and in the case when the buffer feature table storing module stores all zeros, outputs a signal instructing the buffering module to output the characters in the buffer for subsequent processing. Because it is much easier to implement a zero-crossing comparator, the circuit according to this embodiment has a relatively simple structure.

As mentioned in the foregoing description, when the technical solution according to the embodiment of the invention is implemented in hardware, a complexity degree of the hardware can be decreased by obtaining the occurrence numbers of all the characters in the target character set, to thereby increase the speed for hardware processing. This is because bit wide (i.e. a number of bits to be processed in parallel) of the circuit is fixed in this instance, and accordingly a controlling circuit required to change the bit wide is omitted. Furthermore, the character parsing module can be implemented by using a decoder only when the bit width is fixed.

FIGS. 6A and 6B show experimental results according to an embodiment of the present invention. In this experiment, a piece of article is used as the text, and the respective target strings shown in the column of "Target String" are searched respectively. The column of "Length" denotes the length of a corresponding target string, i.e. the value of a. The column of "Matching Number" denotes times of finding the respective target strings in the text. The column of "Matching Number of Feature" denotes the times of outputting the buffer when searching the respective target strings. The column of "Average Jumping Distance" denotes an average length of the buffers when searching the respective target strings. As described above, the precise pattern matching operation needs to be performed only once for each buffer; accordingly, the longer the average length of the buffers is, the less times of precise pattern matching operation are performed. As can be learned from the experimental results, the average length of the buffers is considerably larger than the length of the target string, which indicates that the times of the precise pattern matching operation are reduced significantly by the algorithm according to the embodiments of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying a target pattern from a stream of patterns, the target pattern and the stream of patterns comprises consecutive elements and the target pattern comprises one or more of the consecutive elements of the stream of patterns, the method comprising:
acquiring a first occurrence value for each element in the target pattern, wherein the first occurrence value is equal to the number of times each element occurs in the target pattern;
storing a predetermined number of consecutive elements from the stream of patterns in a buffer as a section of elements, wherein the section of elements is defined by a buffer starting point indicator and a buffer ending point indicator;
determining a second occurrence value for each element in the target pattern, wherein the second occurrence value is equal to the number of times each element in the target pattern occurs in the section of elements stored in the buffer;
updating the buffer to include one additional element in the section of elements by moving the buffer ending point indicator towards the end of the stream of patterns by one element;
repeating determining the second occurrence value and updating the buffer until the second occurrence value matches the first occurrence value for each element in the target pattern;
outputting the elements in the buffer in response to determining the second occurrence value matches the first occurrence value for each element in the target pattern;
performing a precise pattern matching operation on the outputted elements of the buffer to determine if the target pattern is contained within only the last x elements of the buffer, wherein x is equal to the number of elements in the target pattern; and
in response to determining the target pattern is not contained within the last x elements of the buffer, resetting the buffer to its initial length by updating the buffer starting point indicator to indicate the (y−x+1)th character, wherein y is equal to the buffer ending point indicator.

2. The method according to claim 1, wherein a length of the buffer is equal to the number of elements stored in the buffer, and wherein an initial length of the buffer is a length of the target pattern.

3. The method according to claim 1, wherein outputting the elements in the buffer for subsequent processing comprises outputting only the last x elements of the buffer.

4. The method according to claim 3, wherein after outputting the elements in the buffer for subsequent processing, the method further comprises:
determining that the target pattern is not contained in the last x elements of the buffer, returning to determining a second occurrence value after resetting the subset of characters stored in the buffer to its initial length.

5. A method for identifying a target string from a text, the text comprises consecutive characters and the target string comprises one or more of the consecutive characters of the text, the method comprising:
acquiring a first occurrence value for each character in the target string, wherein the first occurrence value is equal to the number of times each character appears in the target string;
storing a predetermined number of consecutive characters from the text in a buffer, wherein the buffer is defined by a buffer starting point indicator and a buffer ending point indicator;
determining a second occurrence value for each character in the target string, wherein the second occurrence value is equal to the number of times each character in the target string occurs in the buffer;
updating the buffer to include one additional character by moving the buffer ending point indicator towards an end of the text by one character;
repeating determining a second occurrence value and updating the buffer until the second occurrence value matches the first occurrence value for each character in the target string;
performing a precise pattern matching operation on the characters of the buffer to determine if the target string is contained within only the last x characters of the buffer, wherein x is equal to the number of characters in the target string; and
in response to determining the target string is not contained within the last x characters of the buffer, resetting the buffer to its initial length by updating the buffer starting point indicator to indicate the (y−x+1)th character, wherein y is the buffer ending point indicator.

6. The method according to claim 5,
wherein the buffer starting point indicator indicates a character in the buffer that is closest to a beginning of the text, and the buffer ending point indicator indicates a character not in the buffer and closest to the end of the text, and the buffer starts at the character indicated by the buffer starting point indicator and ends at a character before the one indicated by the buffer ending point indicator.

7. The method according to claim 5, wherein a length of the buffer is equal to the number of characters stored in the buffer, and wherein an initial length of the buffer is equal to a length of the target string.

8. The method according to claim 5, wherein the character indicated by the buffer ending point indicator is not stored in the buffer.

9. The method according to claim 5, further comprising:
updating a counter in response to the additional character added to the buffer during updating being one of the characters of the target string.

10. The method according to claim 5, further comprising:
updating a counter in response to one of the characters of the target string matching one of the characters in the buffer.

11. A method for identifying a target string from a text, the text comprises consecutive characters and the target string comprises one or more of the consecutive characters of the text, the method comprising:
determining a first occurrence value for each character of the target string, wherein the first occurrence value is equal to the number of times each character appears in the target string;
storing a subset of characters in a buffer, the subset comprising a predetermined number of consecutive characters from the text, wherein a first character of the subset is indicated by a buffer starting point indicator and a last character of the subset is a character immediately prior to a character of the text indicated by a buffer ending point indicator;
determining a second occurrence value for each character of the target string, wherein the second occurrence value is equal to the number of times each character of the target string appears in the subset of characters stored in the buffer;
updating the subset to include one additional character by moving the buffer ending point indicator towards an end of the text by one character such that the number of characters include in the subset of characters increase by one;
iteratively performing determining a second occurrence value and updating the buffer until the second occurrence value matches the first occurrence value for each and every character of the target string, wherein during each subsequent iteration a match between the first occurrence value and the second occurrence value is determined only for the last character in the subset added by updating the buffer;
performing a precise pattern matching operation on the characters of the subset of characters stored in the buffer to determine if the target string is contained within only the last x characters of the subset of characters stored in the buffer, wherein x is equal to the number of characters in the target string; and
in response to determining the target string is not contained within the last x characters of the subset of characters stored in the buffer, resetting the subset of characters stored in the buffer to its initial length by updating the buffer starting point indicator to indicate the (y−x+1)th character, wherein y is the buffer ending point indicator.

12. The method according to claim 11,
wherein the buffer starting point indicator indicates a character in the buffer that is closest to a beginning of the text, and the buffer ending point indicator indicates a character not in the buffer and closest to the end of the text, and the buffer starts at the character indicated by the buffer starting point indicator and ends at a character before the one indicated by the buffer ending point indicator.

13. The method according to claim 11, wherein a length of the buffer is equal to the number of characters in the subset, and wherein an initial length of the subset is equal to a length of the target string.

14. The method according to claim 11, wherein the character indicated by the buffer ending point indicator is not stored in the buffer.

15. The method according to claim 11, further comprising:
updating a counter in response to the additional character added to the subset during updating being one of the characters of the target string.

16. The method according to claim 11, further comprising:
   updating a counter in response to one of the characters of the target string matching one of the characters in the subset.

17. The method according to claim 11, wherein the buffer starting point indicator indicates a character in the buffer that is closest to a beginning of the text, and the buffer ending point indicator indicates a character not in the buffer and closest to the end of the text, and the buffer starts at the character indicated by the buffer starting point indicator and ends at a character before the one indicated by the buffer ending point indicator.

* * * * *